United States Patent [19]
Childers et al.

[11] Patent Number: 5,838,955
[45] Date of Patent: Nov. 17, 1998

[54] CONTROLLER FOR PROVIDING ACCESS TO A VIDEO FRAME BUFFER IN SPLIT-BUS TRANSACTION ENVIRONMENT

[75] Inventors: Brian A. Childers, Santa Clara; Eric A. Baden, Saratoga, both of Calif.

[73] Assignee: Apple Computer, Inc., Cupertino, Calif.

[21] Appl. No.: 434,197

[22] Filed: May 3, 1995

[51] Int. Cl.$^6$ .............................. G06F 15/16; G06F 13/00
[52] U.S. Cl. .......................... 395/503; 395/501; 395/509; 395/511; 395/526; 395/287; 395/293; 345/485; 345/201
[58] Field of Search ..................................... 395/162–166, 395/280, 287–305, 309–312, 427, 428, 431–433, 474–479, 501, 503–505, 508, 509, 511, 520, 521, 526; 345/185, 186, 189, 201

[56] References Cited

U.S. PATENT DOCUMENTS

| | | | |
|---|---|---|---|
| 5,257,348 | 10/1993 | Roskowski et al. | 395/509 |
| 5,263,138 | 11/1993 | Wasserman et al. | 395/294 |
| 5,274,753 | 12/1993 | Roskowski et al. | 395/509 |
| 5,301,272 | 4/1994 | Atkins | 395/501 |
| 5,388,207 | 2/1995 | Chia et al. | 395/164 |
| 5,392,407 | 2/1995 | Heil et al. | 395/293 |
| 5,469,435 | 11/1995 | Krein et al. | 395/285 |
| 5,507,026 | 4/1996 | Fukushima et al. | 395/163 |
| 5,511,165 | 4/1996 | Brady et al. | 395/200.01 |
| 5,522,061 | 5/1996 | Burgoon et al. | 395/496 |

FOREIGN PATENT DOCUMENTS

WOA9400834  6/1994  WIPO.

OTHER PUBLICATIONS

Patent Abstracts of Japan, vol. 12, No. 266 (P–735), 26 Jul. 1988 & JP, A, 63 052235 (Hitachi Limited), Mar. 5, 1988.
*PowerPC 601 RISC Microprocessor User's Manual*, pp. 2–42 through 2–70; 8–1 through 8–36; and 9–1 through 9–52, published by Motorola in 1993.
*PCI Local Bus Specification*, Review Draft Revision 2.1, published Oct. 21, 1994 by the PCI Special Interest Group, P.O. Box 14070, Portland, OR 97214.
*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Kee M. Tung
*Assistant Examiner*—U. Chauhan
*Attorney, Agent, or Firm*—Burns, Doane, Swecker & Mathis, L.L.P.

[57] ABSTRACT

A system includes a requesting agent coupled to a system bus. The system bus includes an address bus, control lines for indicating a requested transfer type, a data bus, address bus arbitration control lines and data bus arbitration control lines. The system further includes a system bus arbiter coupled to the system bus for resolving competing requests for access to the address bus and for separately resolving competing requests for access to the data bus. A graphics controller for enabling the requesting agent to access a frame buffer has a memory, which may be a FIFO, responsive to a first control signal, for storing data received from a frame buffer. The memory is further responsive to a second control signal for supplying the stored data to the data bus. The graphics controller also includes a controller coupled to the system bus and to the memory means. In response to a frame buffer read request from the requesting agent, the controller initiates a frame buffer read operation in accordance with parameters contained in the received frame buffer read request, and also initiates a request for access to the data bus. The first control signal is generated in response to data associated with the read request becoming available at an output of the frame buffer. The second control signal is generated in response to the requested access to the data bus being granted.

8 Claims, 6 Drawing Sheets

FIG_1
(PRIOR ART)

FIG_2
(PRIOR ART)

FIG_3

FIG_4A

FIG_4B

FIG_5

CONTROLLER FOR PROVIDING ACCESS TO A VIDEO FRAME BUFFER IN SPLIT-BUS TRANSACTION ENVIRONMENT

BACKGROUND

The present invention relates to graphics controllers, and more particularly to means within a graphics controller for accessing a video frame buffer in response to an access request received by means of a system bus having split-bus transaction capability.

Figure 1:
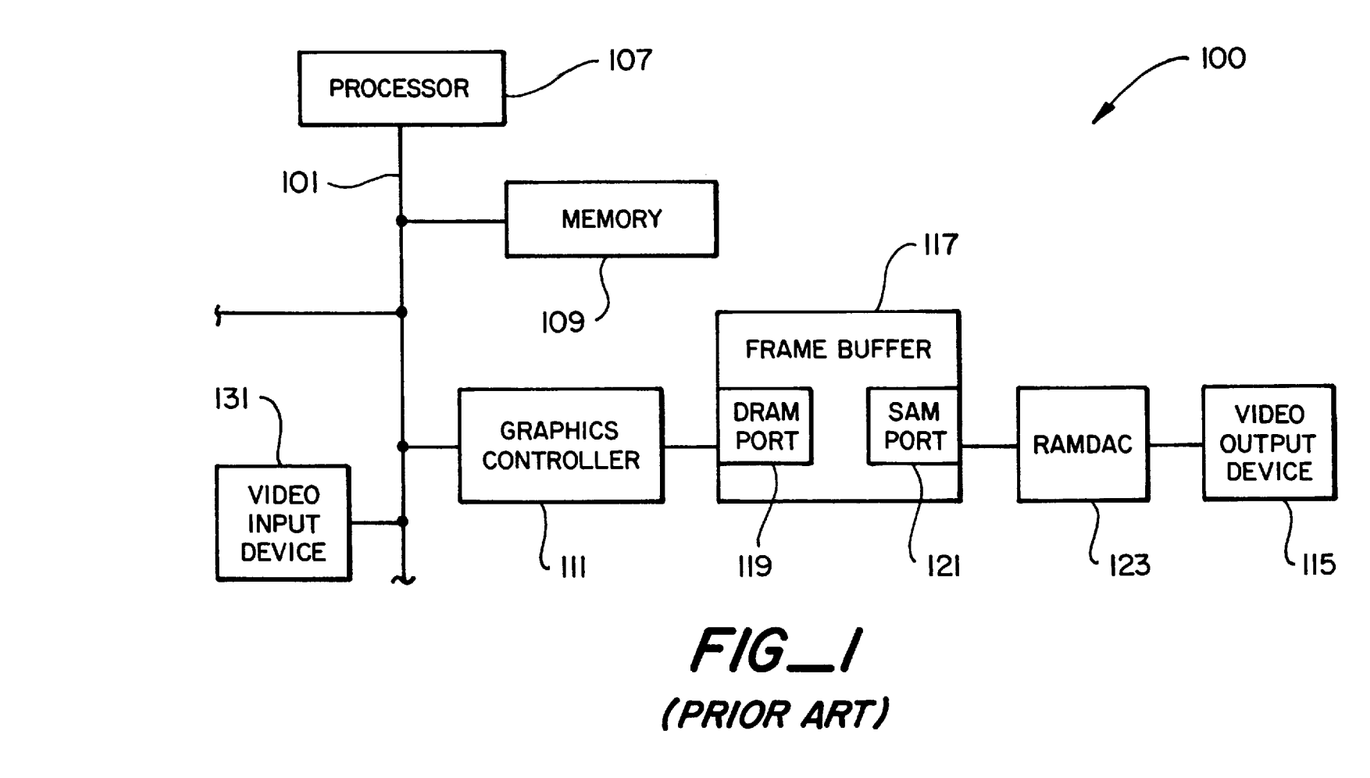
FIG. 1 is a block diagram of a prior art computer system including a graphics controller connected to a tightly ordered system bus.

Computer architectures typically consist of a number of elements, such as one or more processors, memory units, and various input/output (I/O) devices, all coupled together by means of a shared computer bus. A typical system is illustrated in FIG. 1. The illustrated computer system 100 is organized around a system bus 101. Attached to the system bus 101 is a processor 107 and a memory 109 from which the processor retrieves program instructions for execution. The memory is also the repository of data operands for use by the processor 107.

In the exemplary system 100, image data is displayed on a video output device 115, which may be, for example, an analog RGB monitor. An image to be displayed is stored in a frame buffer 117 as a set of pixels, the form of which may be in accordance with any of a number of well-known pixel formats, such as RGB or YUV. The frame buffer 117 is a video random access memory (VRAM) which is a special type of dynamic RAM (DRAM) that has a DRAM port 119 (from which pixel data may be randomly accessed) and a serial access mode (SAM) port 121, each for accessing the pixel data stored in the frame buffer 117. The SAM port 121 is connected to a RAMDAC 123, which reads the serial stream of pixel data from the frame buffer 117, and converts the digital bit stream into appropriate analog signals for driving the primary video output device 115.

Also coupled to the system bus 101 in the exemplary system 100 is a video input device 131. The video input device 131 may, for example, supply pixel data that needs to be written to the frame buffer 117 in real time.

The frame buffer 117 may receive competing requests from a number of sources for read or write access. These include requests made by a source coupled to the system bus 101 (e.g., the processor 107 or the video input device 131), a request made on behalf of the RAMDAC 123 (e.g, by a graphics controller) for a SAM data transfer cycle to be performed, or the need to perform a frame buffer refresh operation (it is well-known that DRAM needs to be refreshed periodically in order to avoid losing the data stored therein).

The frame buffer 117 is incapable of servicing all of these requests simultaneously. Therefore, a graphics controller 111 is also provided, which has one interface for connection to the system bus 101 and another interface for connection to the DRAM port 119 of the frame buffer 117. One function of the graphics controller 111 is to receive frame buffer access requests from the system bus 101 and to provide these to the frame buffer 117 for servicing. Because of the likelihood of occasionally competing frame buffer access requests, the graphics controller also includes an arbiter for prioritizing received requests, and presenting them to the frame buffer 117 one at a time. If an access request received from the system bus 101 is a frame buffer read request, the graphics controller will also make sure that when the data arrives from the frame buffer 117 (which typically operates at much slower speeds than the system bus 101 is capable of handling), it is placed on the system bus 101 for transmission to the originator of the request.

In order to facilitate the interconnection of system components that are made by independently operating manufacturers, a number of bus architectures have been standardized. Each bus architecture specifies the necessary electrical and functional characteristics for allowing one device to communicate with others on the same bus.

Bus characteristics can vary widely from one standard architecture to another. For example, some bus architectures include separate address and data lines, while others use shared lines that are time multiplexed between representing address and data information. Regardless of the physical manifestation, however, a typical computer system bus is conceptually divided into an address bus, a data bus and a control bus. A bus transaction is a complete exchange between two bus devices, and typically comprises both an address phase, during which address information is presented on the address bus, and a data phase during which data information is presented on the data bus.

In prior art systems of the type illustrated in FIG. 1, it is generally the rule that the data phase of a bus transaction follows the address phase of the same transaction in ordered succession, without any other data phase of any other bus transaction intervening. In such a case, the system bus is said to be "tightly ordered."

It is a consequence of the use of a tightly ordered system bus in such systems that if a frame buffer read request is presented to the graphics controller 111, then the system bus 101 cannot be used for any other purpose until the request is serviced. Because the frame buffer read can be lengthy, compared to the speed at which the system bus is capable of operating, the processing of all units attached to the system bus can suffer. The resulting inefficiency in this case is not the fault of the graphics controller 111, which of course lacks the prescience to start the desired frame buffer read operation before the request has been received. Rather, it has been necessary to accept this level of performance in prior art systems of the type described.

In contrast to the tightly ordered bus architecture described above, some minicomputer and mainframe computers, and more recently some small computer architectures, employ buses that are "loosely ordered" such that, between the address phase of a bus transaction and the corresponding data phase, other data phases of other bus transactions may occur. The ability of the bus to allow the address bus and data bus to have different masters at the same time is called "split-bus transaction capability", and is enabled, in part, by having separate address and data lines, and in part by having a bus arbiter capable of making address bus grants independent of data bus grants. The PowerPC™ computer architecture, co-developed by Apple Computer, utilizes a loosely ordered system bus that provides split-bus transaction capability.

PowerPC™ machines currently sold by Apple are based largely on the Motorola MPC601 RISC microprocessor. The MPC601 permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in the exchange. The address and data tenures of each access request must be arbitrated separately from one another. However, the request for a data bus tenure is not made explicitly, but is instead implied by the occurrence of a corresponding address bus request/transaction. More information about the particulars of the system bus in the MPC601 RISC microprocessor may be found in the *PowerPC* 601 *RISC Microprocessor User's Manual,* published by Motorola in 1993, which is incorporated herein by reference in its entirety. Another loosely coupled system bus is described in U.S. patent application Ser. No. 08/432,620, which was filed by James Kelly et al. on May 2, 1995, and entitled BUS TRANSACTION REORDERING USING SIDE-BAND INFORMATION SIGNALS, now U.S. Pat. No. 5,592,361 and which is incorporated herein by reference in its entirety. The bus that is described in U.S. patent application Ser. No. 08/432,620 is a superset of the conventional PowerPC™ 601 microprocessor interface, and is known as the Apple RISC Bus™, or ARBus™.

One advantage that is provided by the use of a loosely coupled bus is the ability to initiate a read operation without tying up the bus waiting for the data to be returned to the requesting agent. This is because the read request comprises concurrently arriving address and transfer attribute signals, which can be immediately received and interpreted by the target agent. In response, the target agent has no need to utilize the address bus, and in theory should not have to tie up the data bus until the requested data is available for transmission.

However, techniques used in prior art graphics controllers are not able to make the most efficient use of a split-bus transaction capability environment. This can be appreciated by examining the prior art strategy for handling frame buffer read requests that would be used by the graphics controller 111 if the system bus 101 had split-bus transaction capability. Referring to the flow chart of FIG. 2, the process starts when the graphics controller 111 receives a frame buffer read request from a requesting agent that is connected to the system bus 101 (now presumed to be a "split response" bus, i.e., one having split-bus transaction capability) (step 201). The graphics controller 111 must now begin the arbitration process to obtain access to the frame buffer 117 and initiate the desired read (step 203). The graphics controller 111 must also request access to the system data bus (step 205), so that the data will have a place to go when it is retrieved from the frame buffer 117. Now the graphics controller 111 must wait for both requests to be honored (steps 207 and 209). If access to the frame buffer 117 is granted and the frame buffer read operation completes before the data bus has been granted, then the frame buffer 117 must sit idle, unavailable for use by the other potentially requesting entities (e.g., SAM data transfer cycle or frame buffer refresh operation). Alternatively, if the data bus is granted prior to completion of the frame buffer read operation, then it is the data bus that sits idle, unavailable for use by any other agent in the system 100.

Figure 2:
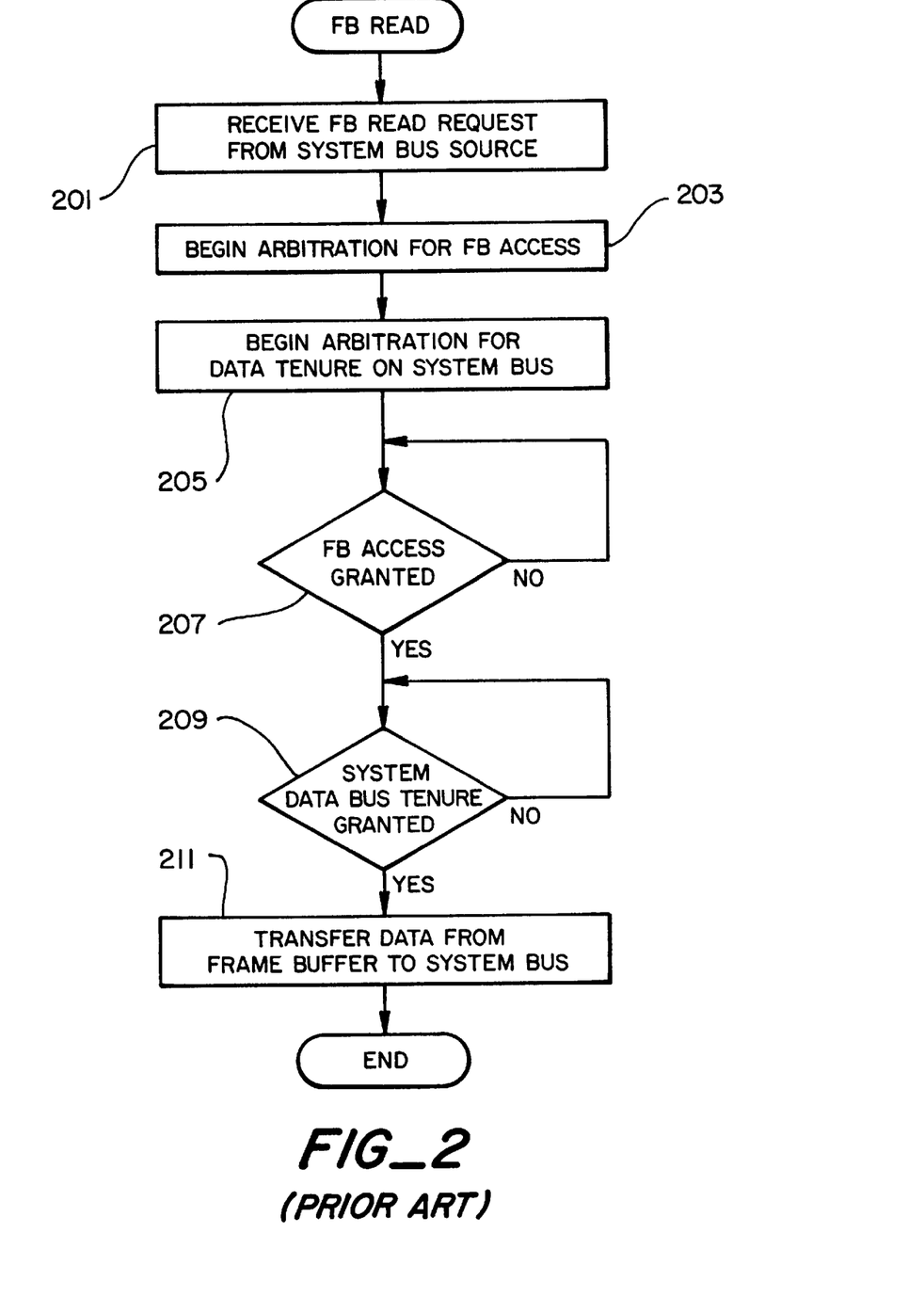
FIG. 2 is a flow chart illustrating the detrimental effects of applying prior art graphics controller techniques in a split-response bus environment.

Moreover, once both requests have been honored (step 211), the data transfer cannot proceed any faster than the frame buffer 117 is capable of operating. As previously explained, this is typically much slower than the speed at which the data bus is capable of operating.

In view of the above, it is an object of the invention to provide a mechanism for efficiently reading data from a frame buffer that is coupled to a bus having split-bus transaction capability.

SUMMARY

In accordance with one aspect of the present invention, the foregoing and other objects are achieved by a graphics controller in a system comprising a requesting agent coupled to a system bus that includes an address bus, control lines for indicating a requested transfer type, a data bus, address bus arbitration control lines and data bus arbitration control lines. The system further includes a system bus arbiter coupled to the system bus for resolving competing requests for access to the address bus and for separately resolving competing requests for access to the data bus.

The graphics controller for enabling the requesting agent to access a frame buffer comprises memory means, and control means. The memory means, which may be a first-in-first-out (FIFO) storage unit, is responsive to a first control signal, for storing data received from a frame buffer. The memory means are further responsive to a second control signal for supplying the stored data to the data bus. Thus, the memory means is interposed between the frame buffer and the system data bus to permit it to serve as a data buffer between the two.

The control means, which are coupled to the system bus and to the memory means, comprise means for receiving a frame buffer read request from the requesting agent. In response to receipt of such request, the controller initiates a frame buffer read operation in accordance with parameters contained in the received frame buffer read request. This may include initiating arbitration to be granted access to the frame buffer. The controller also makes a request for access to the data bus. When data is available at the output of the frame buffer, the controller generates the first control signal, which causes that data to be clocked into the memory means. When the data bus is granted, the controller generates the second control signal in order to cause the data in the memory means to be supplied to the system data bus.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 3:
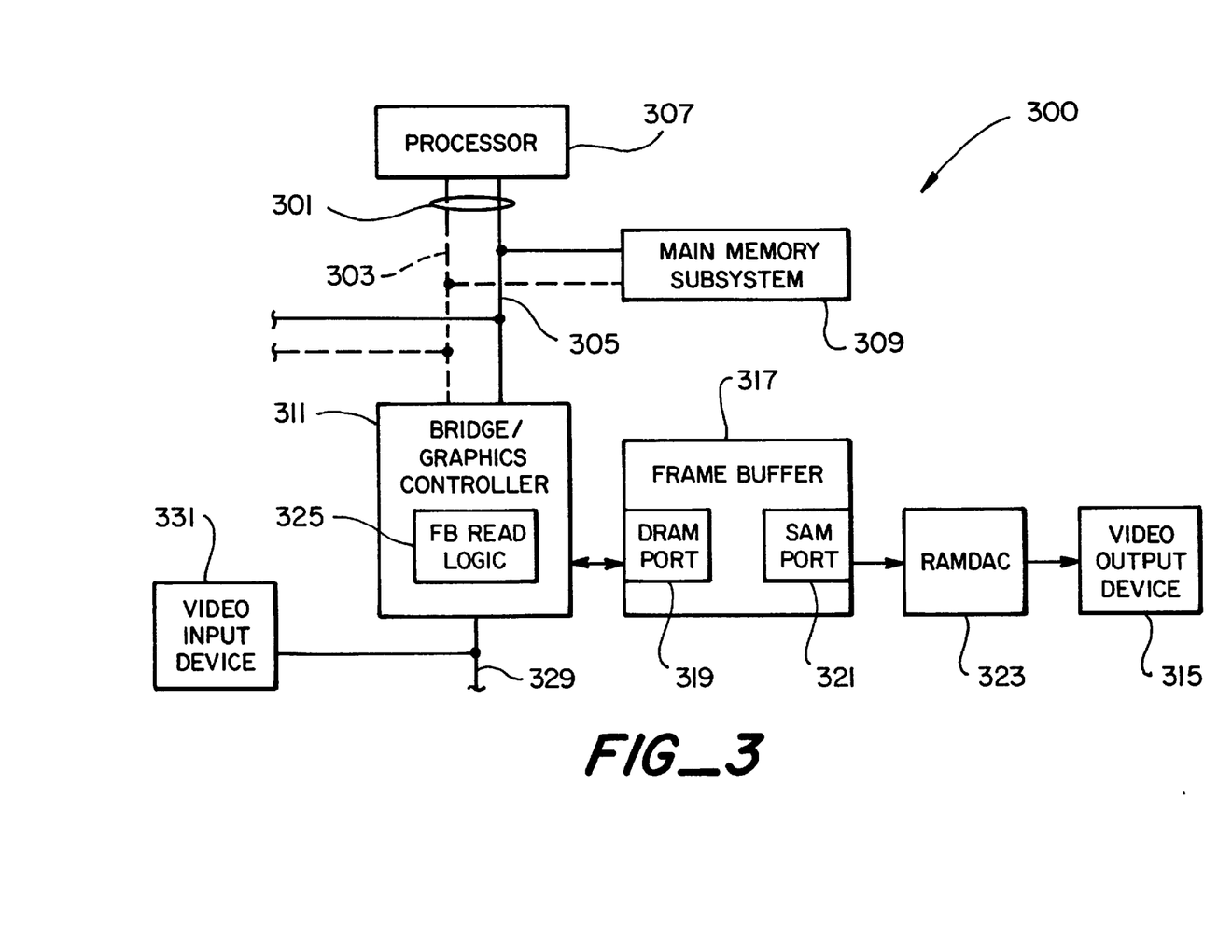
FIG. 3 is a block diagram of a computer system in which the present invention is utilized.

Referring to FIG. 3, the present invention may be used in a computer system 300 of the type shown. It should be understood, however, that the invention is not limited for use only in the illustrated embodiment as described below, but may be used in any system having a split-bus transaction capability environment.

The computer system 300 is organized around a system bus 301 that comprises an address bus 303 and a data bus 305. Furthermore, the system bus 301 is loosely coupled type that has split-bus transaction capability, such as the ARBuS® described in the BACKGROUND section of this disclosure. Accordingly, it will be appreciated that the system bus 301 further comprises the necessary control signals to permit address arbitration, data arbitration and the communication of transfer attribute information. These signals have been omitted from the figure, however, in order to avoid overly cluttering the illustration.

Attached to the system bus 301 is a processor 307, such as the PowerPC™ 601 microprocessor described above, which is capable of operating in a split-bus transaction environment. For purposes of simplifying the drawing, also attached to the system bus 301 is a block designated as main memory subsystem 309. Those having ordinary skill in the art will appreciate that the main memory subsystem 309 may comprise any combination of static or dynamic random access memory (SRAM or DRAM) as well as read only memory (ROM) and cache memory. For further simplification of the drawing, the main memory subsystem 309 also includes arbitration logic for resolving conflicting access requests made to the address and data buses 303, 305. A more detailed description of these features, which are well-known in the art, is beyond the scope of this disclosure.

In the exemplary system 300, image data is displayed on a video output device 315, which may be, for example, an analog RGB monitor. An image to be displayed is stored in a frame buffer 317 as a set of pixels, the form of which may be in accordance with any of a number of wellknown pixel formats, such as RGB or YUV. The frame buffer 317 is a video random access memory (VRAM) having a DRAM port 319 (from which pixel data may be randomly accessed) and a serial access mode (SAM) port 321, each for accessing the pixel data stored in the frame buffer 317. The SAM port 321 is connected to a RAMDAC 323, which reads the serial stream of pixel data from the frame buffer 317, and converts the digital bit stream into appropriate analog signals for driving the primary video output device 315.

The exemplary system 300 also includes a video input device 331, which is connected to an expansion bus 329. The video input device 331 may, for example, supply pixel data that needs to be written to the frame buffer 317 in real time. In a preferred embodiment of the invention, the expansion bus is a well-known standardized bus known as a PCI local bus, although this is not particularly critical to the operation of the invention. Nonetheless, a complete description of the PCI local bus is presented in the *PCI Local Bus Specification*, Review Draft Revision 2.1, published Oct. 21, 1994 by the PCI Special Interest Group, P.O. Box 14070, Portland, Oreg. 97214, which is incorporated herein by reference in its entirety.

A combination bridge/graphics controller 311 is provided, which has one interface for connection to the system bus 301, another interface for connection to the DRAM port 319 of the frame buffer 317, and a third interface for connection to the expansion bus 329. One function of the bridge/graphics controller 311 is to act as a bridge for communications between the otherwise incompatible system bus 301 and expansion bus 329. This function of the bridge/graphics controller is not pertinent to the present invention, and will not be described here in further detail.

Another function of the bridge/graphics controller 311, which is the focus of the present invention, is to receive frame buffer access (read and write) requests alternatively from the system bus 301 or from the expansion bus 329 and to provide these to the frame buffer 317 for servicing. Because, in the illustrative embodiment of the invention, it is possible for frame buffer access requests to be made simultaneously from sources attached, respectively, to the system bus 301 and to the expansion bus 329, the bridge/graphics controller 311 must arbitrate between these as well as the frame buffer access requests associated with SAM data transfer cycles and frame buffer refresh cycles.

The bridge/graphics controller also includes frame buffer read logic 325 for performing frame buffer read operations in response to requests made by an agent (e.g., the processor 307) coupled to the system bus 301. In accordance with the present invention, the frame buffer read logic is designed to fulfill its purpose while making efficient use of the system bus 301. It achieves this by means of a memory device for buffering data between the frame buffer and the system bus 301, as well as appropriate control logic for efficiently using all of the hardware resources.

A preferred embodiment of the hardware for routing the flow of data from one point to another within the bridge/graphics controller 311 will now be described with reference to FIGS. 4A and 4B, which will henceforth be referred to as FIG. 4, which together depict a block diagram of the overall data flow within the bridge/graphics controller 311. Three data interfaces are provided for connection to the following: the 64-bit wide system data bus 305, the 32-bit wide expansion bus 329 (which, in a preferred embodiment is multiplexed between address and data information and is a tightly ordered bus), and the 64-bit wide frame buffer (FB) data bus 401. Various multiplexors 403, 405, 407, 409, 411, 413, 415, 417, 419, 421 and flip-flops 423, 425, 427, 429, 431, 433 are provided, along with a number of first-in-first-out memory units (FIFOs) 435, 437, 439, 441, 443, 445, 447 that are arranged within the data paths as shown, for switching the data from any one source to any of the other destinations, for buffering data between the various sources and destinations, and for converting between the 64-bit and 32-bit interfaces.

Byte reordering logic 457 is provided at the interface to the frame buffer 317, in order to write and read pixel data in a standard format (e.g., big-endian) regardless of the format in which an agent, such as the video input device 331, creates or expects to receive them. The particulars of this logic are not pertinent to the present invention.

The bridge/graphics controller 311 further includes a controller 453 for generating the various control signals that are required for coordinating the operation of all of the resources within the bridge/graphics controller. In a preferred embodiment, the bridge/graphics controller 311 comprises two application specific integrated circuits (ASICs), one comprising all of the data flow hardware, and the other comprising all of the necessary control logic.

Figure 4A:
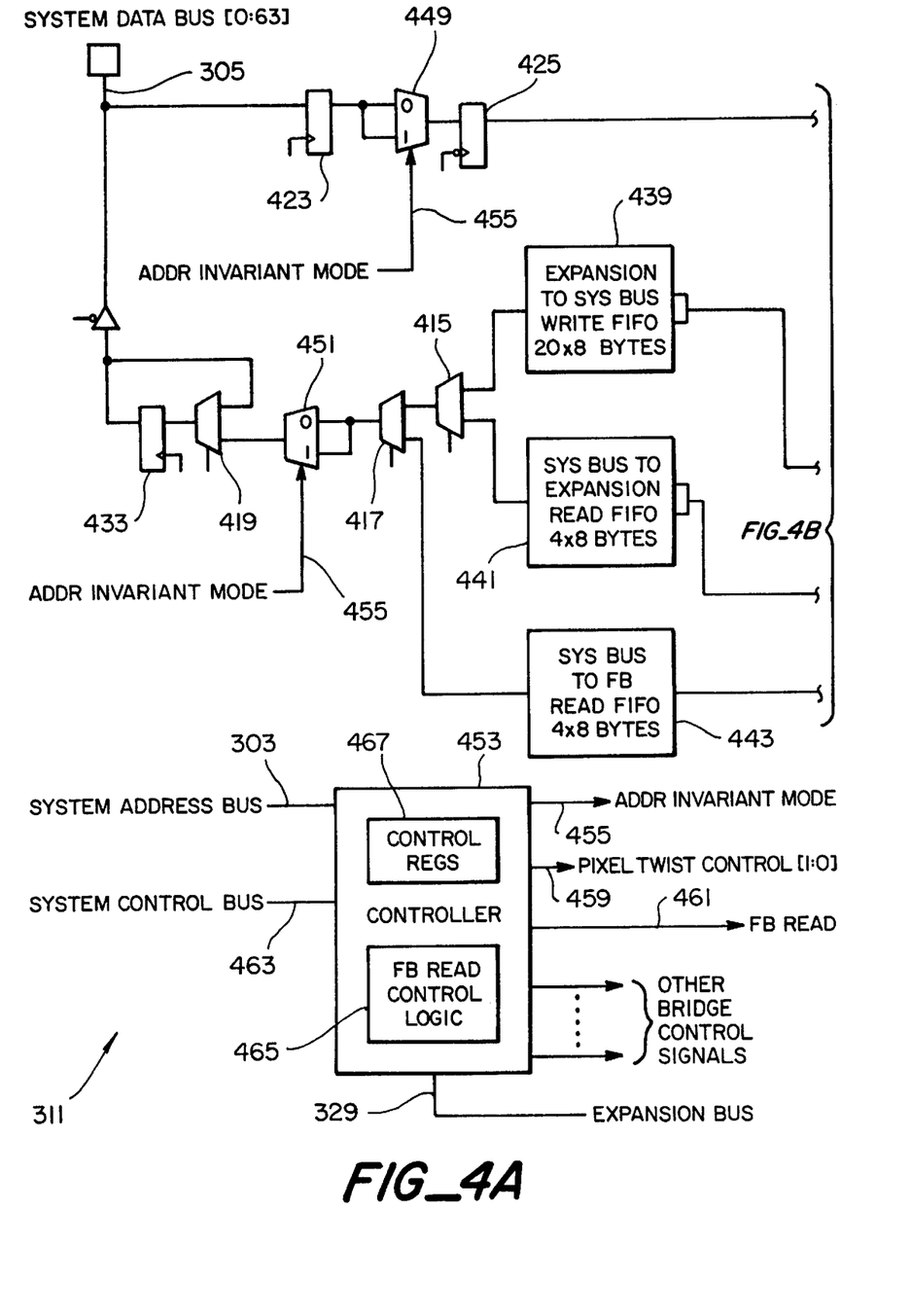
FIGS. 4A and 4B is a block diagram of the overall data flow within the inventive bridge/graphics controller.
Figure 4B:
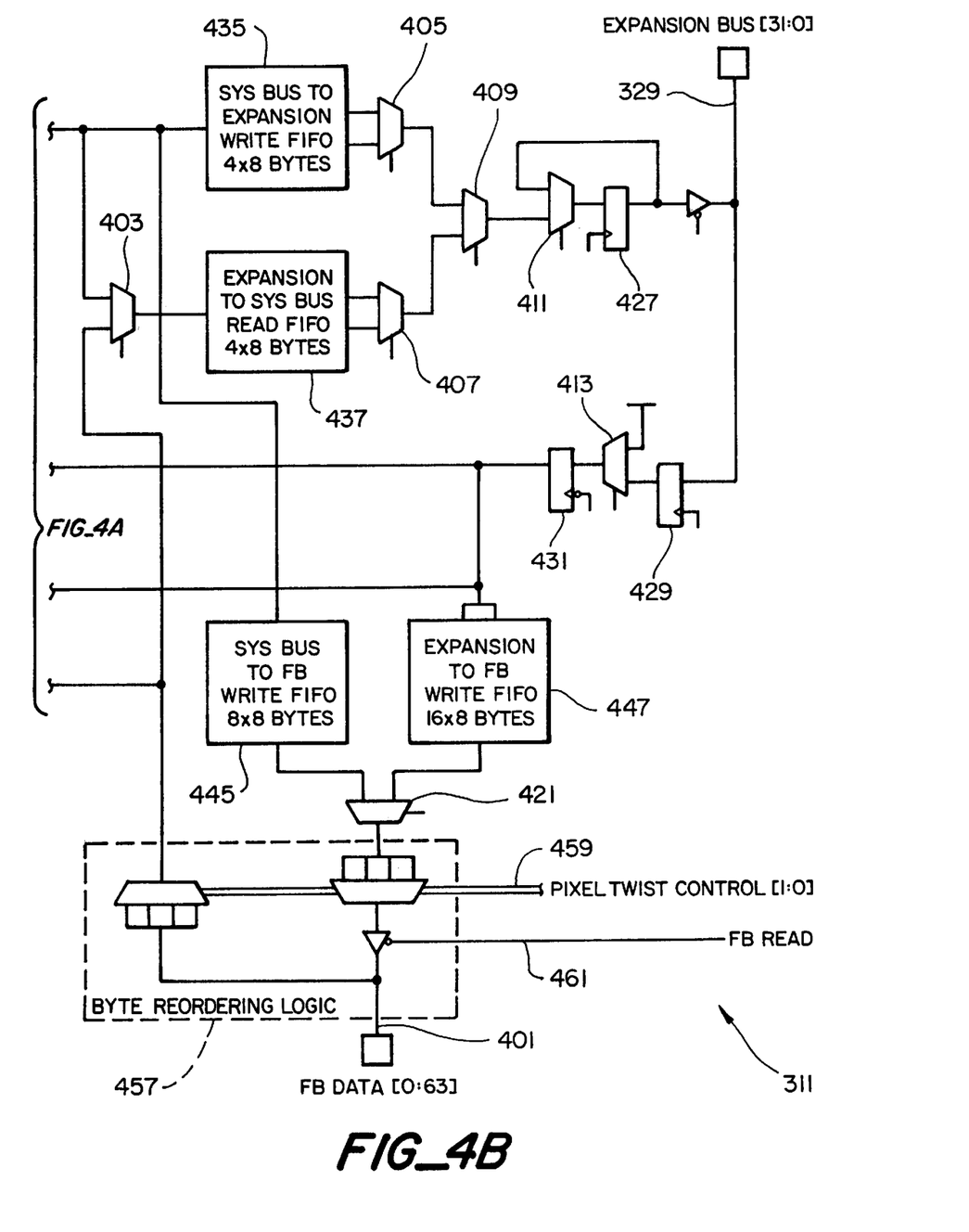

For the sake of clarity, most of the control signal connections between the controller 453 and each of the resources within the bridge/graphics controller 311 have been omitted from FIG. 4. However, the interfaces between the controller 453 and the system address bus 303, system control bus 463, expansion bus 329, and frame buffer 317 are generally depicted. Complete descriptions of these interfaces however, which are well-known in the art, are beyond the scope of this description.

Of some pertinence to the present invention are the SysBus-to-FB write FIFO 445 and the ExpansionBus-to-FB write FIFO 447, which buffer 64-bit wide data that is to be written from the respective system data bus 305 and expansion bus 329 to the frame buffer 317 by means of the bi-directional frame buffer data bus 401. The input and output byte swap multiplexors 449, 451 and the byte reordering logic 457 may be used for converting pixel data into a uniform format for storage in the frame buffer, regardless of the endian characteristics of the source or the bus upon which the pixel data is communicated. The input and output byte swap multiplexors 449, 451 also serve for conditionally enforcing the rule of "address invariance" for communications between the system bus 301 and the expansion bus 329. A complete description of either of these aspects of the data flow is beyond the scope of this disclosure, and is not pertinent to the understanding of the present invention.

Of great importance to the present invention is the presence of the SysBus-To-FB Read FIFO 443, which is preferably a flow-through memory device capable of storing four 64-bit units of information, and presenting them in first-in-first-out order. The SysBus-To-FB Read FIFO 443 is configured to receive data from the frame buffer data bus 401, and to provide that data to the system data bus 305. Therefore, the SysBus-To-FB Read FIFO 443 serves as a data buffer between the frame buffer 317 and the system data bus 305. The selection of a four-deep FIFO for this purpose in the preferred embodiment permits the SysBus-To-FB Read FIFO 443 to buffer all of the data necessary for satisfying a burst operation on the system data bus 305.

The frame buffer read control logic 465 is that part of the controller 453 that determines the presence of frame buffer read requests received from the system bus 301, and responds by coordinating the hardware resources in an efficient manner for carrying out the operation. The particulars of the operation of the frame buffer read control logic 465 will now be described in detail with reference to the flow chart of FIG. 5.

Figure 5:
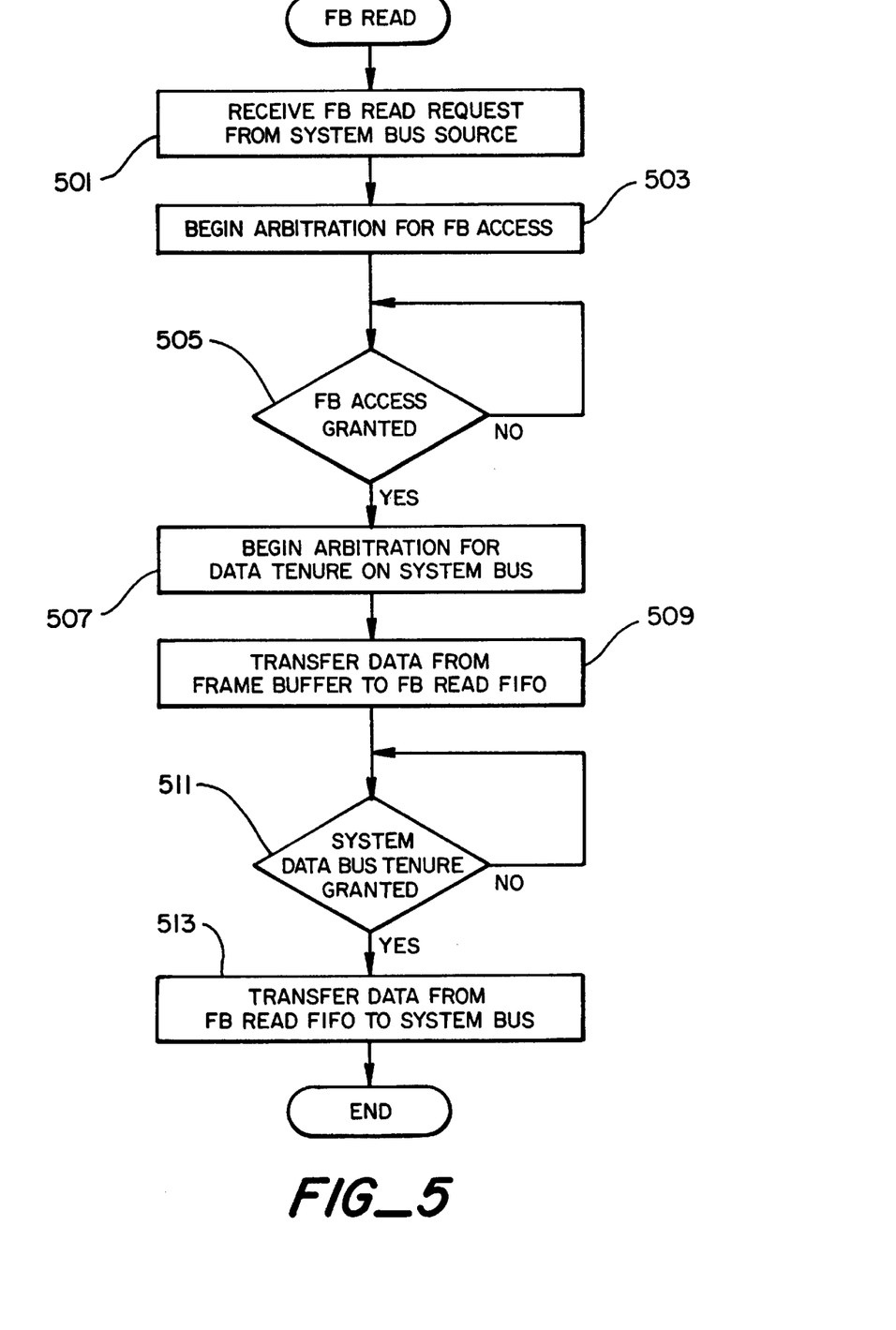
FIG. 5 is a flow chart of steps performed by a graphics controller in accordance with the present invention.

The operation begins when a frame buffer read request is received from the system bus 301 (step 501). The frame buffer read control logic 465 responds by initiating arbitration to receive a frame buffer read access (step 503), and then waiting for that request to be granted (step 505). As explained above, there may be other pending requests for access to the frame buffer. Possible requestors for these accesses include the video input device 331, a SAM port data cycle and a scheduled frame buffer refresh cycle. Consequently, there may be a delay between initiation of frame buffer arbitration and the granting of frame buffer access.

When the frame buffer read control logic 465 receives a frame buffer acknowledge signal from the frame buffer arbitration logic (not shown), it proceeds to step 507, where it begins arbitration for a data tenure on the system data bus 305. At step 511, the frame buffer read control logic 465 waits for the system data bus 305 to be granted by the system bus arbiter (part of the main memory subsystem 309, as explained above).

It will be observed that receipt of the frame buffer acknowledge signal does not signify completion of the frame buffer read operation. Rather, it means only that the read operation will begin. Nonetheless, the data bus arbitration step 507 is initiated at this point because the known timing of the frame buffer 317 virtually guarantees that at least one 64-bit wide quantity of data will be ready for reading by the time the system data bus 305 is granted.

Accordingly, the next thing that the frame buffer read control logic 465 does is to transfer frame buffer data to the SysBus-To-FB Read FIFO 443 as it arrives (step 509). If the bridge/graphics controller 311 has been granted access to the system data bus 305, then the frame buffer read control logic 465 transfers the data from the SysBus-To-FB Read FIFO 443 to the system data bus 305 for receipt by the requesting agent.

The flow chart of FIG. 5 has been simplified in order to ease understanding of the invention. It will be appreciated by those having ordinary skill in the art that a practical implementation of the invention must further take into account other factors, such as the possibility, during a requested burst read operation, that only some of the requested data has been loaded into the SysBus-To-FB Read FIFO 443 when access to the system data bus 305 has been granted. This situation may be handled by transferring each data beat as it arrives. Thus, FIG. 5 would include additional decision logic to determine whether all of the requested data had been read from the frame buffer 317, and if not, to transfer whatever was available and to branch back to a previous step to wait for the rest of the data.

The advantages of the inventive technique for accessing a frame buffer in a split-response bus environment should now be apparent. Because the arbitration for the system data bus 305 is not initiated until after the frame buffer read acknowledge signal is received, the system data bus 305 is available for use by other entities attached to the system bus 301. Furthermore, the presence of the SysBus-To-FB Read FIFO 443, which buffers data from the frame buffer 317, means that the frame buffer 317 is never left idle waiting for the system data bus 305 to be granted. Instead, the frame buffer 317 can supply the requested data to the SysBus-To-FB Read FIFO 443 as soon as that data is available, and then make itself available to another requester. Moreover, when a transfer of data does occur from the bridge/graphics controller 311 to the requesting agent on the system data bus 305, that transfer can occur at speeds limited by the bandwidth of the system bus 301, rather than being limited by the slower frame buffer access times.

The invention has been described with reference to a particular embodiment. However, it will be readily apparent to those skilled in the art that it is possible to embody the invention in specific forms other than those of the preferred embodiment described above. This may be done without departing from the spirit of the invention. Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a system comprising a requesting agent coupled to a system bus that comprises an address bus, control lines for indicating a requested transfer type, a data bus, address bus arbitration control lines and data bus arbitration control lines, the system further including a system bus arbiter coupled to the system bus for resolving competing requests for access to the address bus and for separately resolving competing requests for access to the data bus, a graphics controller for enabling the requesting agent to access a frame buffer, the graphics controller comprising:

memory means, responsive to a first control signal, for storing data received from the frame buffer, the memory means being further responsive to a second control signal for supplying the stored data to the data bus; and control means, coupled to the system bus and to the memory means, comprising:
   means for receiving a frame buffer read request from the requesting agent;
   means for initiating a frame buffer read operation in accordance with parameters contained in the received frame buffer read request;
   means for requesting access to the data bus;
   means for generating the first control signal in response to data associated with the frame buffer read request becoming available at an output of the frame buffer; and means for generating the second control signal in response to the requested access to the data bus being granted.

2. The graphics controller of claim 1, wherein the memory means is a first-in-first-out memory device.

3. The graphics controller of claim 1, wherein the means for initiating the frame buffer read operation includes frame buffer arbitration means for resolving competing requests for access to the frame buffer.

4. In a system comprising a requesting agent coupled to a system bus that comprises an address bus, control lines for indicating a requested transfer type, a data bus, address bus arbitration control lines and data bus arbitration control lines, the system further including a system bus arbiter coupled to the system bus for resolving competing requests for access to the address bus and for separately resolving competing requests for access to the data bus, a method of enabling the requesting agent to access a frame buffer, the method comprising the steps of:

receiving a frame buffer read request from the requesting agent;

initiating a frame buffer read operation in accordance with parameters contained in the received frame buffer read request;

requesting access to the data bus;

detecting availability of data at an output of a frame buffer, the data being associated with the frame buffer read request;

storing the data from the output of the frame buffer into memory means; and supplying the stored data from the memory means to the data bus in response to the requested access to the data bus being granted.

5. The method of claim 4, wherein the memory means is a first-in-first-out memory device.

6. The method of claim 4, wherein the step of initiating the frame buffer read operation includes resolving competing requests for access to the frame buffer.

7. A graphics controller for enabling a requesting agent, coupled to a system bus, to access a frame buffer, the graphics controller comprising:

memory means, responsive to a first control signal, for storing data received from the frame buffer; and control means, coupled to the memory means, comprising:

means for receiving a frame buffer read request from the requesting agent via the system bus;

means for initiating a frame buffer read operation in accordance with parameters contained in the received frame buffer read request; and means for generating the first control signal in response to data associated with the frame buffer read request becoming available at an output of the frame buffer, wherein the system bus comprises: an address bus, control lines for indicating a requested transfer type, a data bus, address bus arbitration control lines and data bus arbitration control lines, wherein competing requests for access to the address bus are resolved separately from resolution of competing requests for access to the data bus.

8. The graphics controller of claim 7, wherein the memory means is a first-in-first-out memory device.

* * * * *